(12) United States Patent
Ha et al.

(10) Patent No.: US 9,856,405 B2
(45) Date of Patent: Jan. 2, 2018

(54) ACRYL-SILICONE-BASED HYBRID EMULSION ADHESIVE COMPOSITION AND METHOD OF PREPARING THE SAME

(71) Applicant: LG CHEM, LTD., Seoul (KR)

(72) Inventors: Jae Woung Ha, Daejeon (KR); Young-Min Kim, Daejeon (KR); Jung Sup Han, Daejeon (KR); Kong Ju Song, Daejeon (KR); Mi Young Kim, Daejeon (KR); Kumhyoung Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/420,221

(22) PCT Filed: Nov. 6, 2013

(86) PCT No.: PCT/KR2013/009981
§ 371 (c)(1),
(2) Date: Feb. 6, 2015

(87) PCT Pub. No.: WO2014/073840
PCT Pub. Date: May 15, 2014

(65) Prior Publication Data
US 2015/0284612 A1    Oct. 8, 2015

(30) Foreign Application Priority Data
Nov. 6, 2012  (KR) .................. 10-2012-0124584

(51) Int. Cl.
| | | |
|---|---|---|
| *C09J 183/06* | (2006.01) | |
| *C09J 7/02* | (2006.01) | |
| *C09J 151/08* | (2006.01) | |
| *C09D 183/10* | (2006.01) | |
| *C08G 77/442* | (2006.01) | |

(52) U.S. Cl.
CPC .......... *C09J 183/06* (2013.01); *C08G 77/442* (2013.01); *C09D 183/10* (2013.01); *C09J 7/02* (2013.01); *C09J 7/0207* (2013.01); *C09J 151/085* (2013.01); *C09J 2201/122* (2013.01); *C09J 2433/00* (2013.01); *C09J 2483/00* (2013.01); *Y10T 428/287* (2015.01)

(58) Field of Classification Search
None
See application file for complete search history.

(56) References Cited

U.S. PATENT DOCUMENTS

| | | | | |
|---|---|---|---|---|
| 3,284,423 A * | 11/1966 | Knapp | .................. | C08F 220/18 156/330 |
| 3,575,910 A * | 4/1971 | Robert | ................. | C08F 283/122 428/447 |
| 3,650,812 A * | 3/1972 | Nordstrom | .......... | C08F 290/148 427/503 |
| 4,693,935 A * | 9/1987 | Mazurek | ............. | C08F 290/068 427/208 |
| 4,994,538 A * | 2/1991 | Lee | ............................ | C09J 4/06 524/806 |
| 5,234,736 A * | 8/1993 | Lee | ............................ | C09J 4/06 428/41.5 |
| 5,308,887 A * | 5/1994 | Ko | ............................ | C09J 4/00 428/446 |
| 5,420,195 A * | 5/1995 | Mayer | ....................... | C08F 8/00 524/556 |
| 5,852,095 A * | 12/1998 | Yamauchi | ................ | C08F 8/42 524/262 |
| 2009/0149573 A1* | 6/2009 | Venzmer | ............... | C08F 283/12 523/201 |
| 2012/0071053 A1* | 3/2012 | Ko | ........................ | C09J 133/08 442/151 |
| 2012/0114737 A1 | 5/2012 | Loubert et al. | | |

FOREIGN PATENT DOCUMENTS

| | | |
|---|---|---|
| CN | 1829752 A | 9/2006 |
| CN | 101121771 A | 2/2008 |
| CN | 101376797 A | 3/2009 |
| CN | 101952384 A | 1/2011 |
| CN | 102449090 A | 5/2012 |
| EP | 1095953 A2 | 5/2001 |
| JP | 62-288676 A | 12/1987 |
| JP | 01-284513 A | 11/1989 |
| JP | 06-077193 A | 3/1994 |
| JP | 7-508060 A | 9/1995 |
| JP | 2009-67824 A | 4/2009 |
| JP | 2010501701 A | 1/2010 |
| JP | 2011513511 A | 4/2011 |

(Continued)

OTHER PUBLICATIONS

"Radiation Curable Silicones an Overview", Evonik Industries, Mar. 2016.*
"Tego RC Silicones, It's all about knowing when to let go", Evonik Industries, Mar. 2016.*
"In-line coating with Tego RC Silicones", Evonik Industries, Mar. 2016.*
Lin, M., et al., "Silicone-polyacrylate composite latex particles. Particles formation and film properties," Polymer 46 (2005), pp. 1331-1337.
"Correlation of Silicone Incorporation into Hybrid Acrylic Coatings with the Resulting Hydrophobic and Thermal Properties", Rodriguez et al., Macromolecules 2008, 41, pp. 8537-8546.

(Continued)

*Primary Examiner* — Anish P Desai
(74) *Attorney, Agent, or Firm* — Dentons US LLP

(57) ABSTRACT

Disclosed are an acryl-silicone-based hybrid emulsion adhesive composition and a method of preparing the same. Particularly, an acryl-silicone-based hybrid emulsion adhesive composition that includes an acrylic emulsion resin prepared by emulsion polymerization of an acrylic monomer mixture and a seed formed of a reactive silicone resin and thus has high weather resistance and heat resistance and a method of preparing the same are provided.

12 Claims, No Drawings

(56) References Cited

FOREIGN PATENT DOCUMENTS

| KR | 10-0210735 | 7/1999 |
|---|---|---|
| KR | 2006-0130397 A | 12/2006 |
| KR | 2008-0100819 A | 11/2008 |
| KR | 2009-025238 A | 3/2009 |
| KR | 10-2010-0122090 | 11/2010 |
| KR | 10-2012-0023749 | 3/2012 |
| WO | 92/20752 A1 | 11/1992 |
| WO | 2012-091742 | 7/2012 |
| WO | 2012-091742 A1 | 7/2012 |

OTHER PUBLICATIONS

Peng He-yan, et al., "Silicon-modified polyacrylate adhesive for electrostatic flocking," Dyeing and Finishing, vol. 36, No. 6, pp. 29-32.

* cited by examiner

ACRYL-SILICONE-BASED HYBRID EMULSION ADHESIVE COMPOSITION AND METHOD OF PREPARING THE SAME

This application is a National Stage Entry of International Application No. PCT/KR2013/009981, filed Nov. 6, 2013, and claims the benefit of Korean Application No. 10-2012-0124584, filed on Nov. 6, 2012, all of which are hereby incorporated by reference in their entirety for all purposes as if fully set forth herein.

TECHNICAL FIELD

The present invention relates to an acryl-silicone-based hybrid emulsion adhesive composition and a method of preparing the same. More particularly, the present invention relates to an acryl-silicone-based hybrid emulsion adhesive composition including an acrylic emulsion resin prepared by emulsion polymerization of an acrylic monomer mixture and a seed formed of a reactive silicone resin and a method of preparing the same.

BACKGROUND ART

Recently, sticker-type surface finishing materials such as interior/exterior materials of buildings, interior design materials, advertising materials, and the like, which employ adhesives, have been increasingly used. Conventional oil-based adhesives as the adhesives incur discharge of residual solvents into air for a long period of time after construction and thus residents of buildings suffer symptoms such as headache, eye, nose and throat irritation, cough, itching, dizziness, fatigue, reduction in concentration, and the like and, when exposed to such residual solvents for a long period of time, suffer sick house syndrome that causes respiratory ailments, heart disease, cancer, and the like.

For such reasons, water-based emulsion adhesives, which use water as a dispersion medium, are environmentally friendly, and do not discharge harmful materials, have received much attention and are rapidly replacing conventional oil-based adhesives. Such water-based emulsion adhesives may use polymers having higher molecular weight than that of solvent-based polymers because adhesive viscosity is not related to molecular weights of polymers as dispersions, may have broad concentration ranges of solid content, have low ageing resistance, low viscosity, and good adhesive strength in a low solid content region, and have good compatibility with other polymers.

However, due to use of water as a solvent, such water-based emulsion adhesives have a slow drying rate, low adhesive strength to hydrophobic adhesive surfaces and non-porous materials, narrow ranges of selection of curing agents, and deteriorated initial adhesive strength. In addition, water-based emulsion adhesives include emulsifiers and dispersants and thus have no superior physical properties (e.g., low water resistance and the like) to those of oil-based adhesives.

Meanwhile, pressure sensitive adhesives (PSAs) generally require excellent initial adhesion, adhesion and cohesion and good balance thereamong, and do not cause of damage to and contamination of a surface of a material adhered by a PSA when the PSA is peeled from the material after long-term adhesion. In addition, PSAs requires slightly low, allowable increase in adhesion even at high temperature and high humidity, which enables a PSA to be clearly peeled off even after a long period of adhesion.

However, it is not easy to prepare PSAs with the desired properties described above and, in particular, water-based acrylic adhesives generally have high surface energy and high polarity and thus are adhered very satisfactorily to materials with high surface energy but are adhered relatively poorly to materials with low surface energy. In addition, water-based acrylic adhesives have high shear resistance and thus have excessively high adhesion and poor heat resistance.

To address these problems, the related art discloses technologies employing advantages of silicone-based materials. Korean Patent Application Publication No. 10-2006-0130397 discloses a method of preparing a UV-curable pressure sensitive adhesive composition by polymerizing an acrylic monomer and silicone acrylate using a photoinitiator. Korean Patent Application Publication No. 10-2008-0100819 discloses a method of preparing an adhesive by blending an acrylate copolymer with silica nanoparticles, whereby peel strength of the adhesive is maintained and the adhesive has increased shear strength (holding power) at high temperature. Korean Patent Application No. 10-2009-0025238 discloses a Si-containing pressure sensitive adhesive composition and, in particular, a silicone acrylate hybrid composition including a reaction product of an ethylene-based unsaturated monomer and an initiator and a method of using the silicone acrylate hybrid composition in a transdermal drug delivery system.

However, the adhesive compositions disclosed in the above-described related art do not exhibit satisfactory weather resistance and heat resistance so as to have stable adhesion and high holding power at high temperature and high humidity even after aging.

Thus, there is a high need to develop adhesives that are environmentally friendly and have excellent weather resistance and heat resistance and thus, when being applied to paper and film labels, may maintain high peel strength and high cohesive strength even under high temperature and high humidity conditions.

DISCLOSURE

Technical Problem

Therefore, the present invention has been made to solve the above problems and other technical problems that have yet to be resolved.

As a result of a variety of intensive studies and various experiments, the inventors of the present invention confirmed that, when an adhesive composition is prepared by copolymerizing an acrylic monomer mixture and a reactive silicone resin through emulsion polymerization, the adhesive composition exhibits advantages of existing acrylic adhesives and characteristics of silicones, i.e., weather resistance and heat resistance, and thus may have excellent adhesive strength and holding power even at high temperature and high humidity, thus completing the present invention.

Technical Solution

In accordance with one aspect of the present invention, provided is an acryl-silicone-based hybrid emulsion adhesive composition including an acrylic emulsion resin prepared by emulsion polymerization of an acrylic monomer mixture and a seed formed of a reactive silicone resin.

The term "monomer mixture" as used herein includes a monomer mixture prepared by addition of acrylic monomers in a mixed state, a monomer mixture prepared by sequentially adding acrylic monomers, and the like.

The reactive silicone resin may, for example, be a conventional thermosetting silicone resin or the like and, in particular, may be at least one selected from polyoganosiloxanes having at least two alkenyl groups as functional groups in single molecule. For example, the alkenyl group may be a vinyl group (ethenyl group), an allyl group (2-propenyl group), a butenyl group, a pentenyl group, a hexenyl group, heptenyl group, an octenyl group, a decenyl group, or the like. In this regard, the alkenyl group may be contained as a constituent unit of a main chain or a constituent unit of a side chain.

In one embodiment, the polyorganosiloxane having at least two alkenyl groups may be polyalkylsiloxane having a functional group, for example, polydimethylsiloxane having a functional group. For example, the functional group may be a hexenyl group and/or a vinyl group. In particular, the polyorganosiloxane having at least two alkenyl groups may be polydimethylsiloxane having a vinyl group as a functional group, polydimethylsiloxane having a hexenyl group as a functional group, or a mixture thereof.

In one embodiment, the reactive silicone resin may have a molecular weight (weight average molecular weight) of 500,000 or less and a particle size of 50 nm to 200 nm and may be included in an amount of 5 parts by weight to 20 parts by weight based on 100 parts by weight of the acrylic monomer mixture.

When the molecular weight of the reactive silicone resin exceeds 500,000, compatibility with acrylic monomers for copolymerization may be poor. When the particle size of the reactive silicone resin is less than 50 nm, it is difficult to prepare small particles. On the other hand, when the particle size of the reactive silicone resin exceeds 200 nm, the size of finally polymerized acrylic emulsion resin increases and thus stability of the acrylic emulsion resin may be reduced. When the amount of the reactive silicone resin is less than 5 parts by weight, it is impossible to achieve desired effects, i.e., excellent adhesion and holding power. On the other hand, when the amount of the reactive silicone resin exceeds 20 parts by weight, compatibility with the acrylic monomers is deteriorated, a material is concentrated at an interface between an adhesive layer and a material to be adhered, which causes transfer of an adhesive to the material to be adhered when the adhesive is peeled off, and adhesion increase effects over time may be insufficient.

In this regard, a minimum molecular weight of the reactive silicone resin may be 2000.

In one embodiment, the acryl-silicone-based hybrid emulsion adhesive composition including an acrylic emulsion resin prepared by emulsion polymerization of an acrylic monomer mixture and a seed formed of a reactive silicone resin may have a solid content of 55% to 65%, a particle size of 200 nm to 400 nm, high polymerization stability, and a viscosity of 500 cps to 2000 cps.

With regards to this, the inventors of the present invention confirmed that the acryl-silicone-based hybrid emulsion adhesive composition may maintain high peel strength and cohesive strength under high temperature and high humidity conditions by combination of advantages of existing acrylic adhesives and properties (weather resistance and heat resistance) of silicone-based adhesives.

In one embodiment, the acryl-silicone-based hybrid emulsion adhesive composition having the above-described properties may be a curable pressure sensitive adhesive (PSA) composition.

Kinds and amounts of acrylic monomers basically determine physical properties of an adhesive and thus it is important to adjust kinds and amounts of acrylic monomers in the acryl-silicone-based hybrid emulsion adhesive composition so that it most effectively exhibits advantages of existing acrylic adhesives. Thus, the acrylic monomer mixture according to the present invention will now be described in detail.

In one embodiment, the acrylic monomer mixture may include: i) a (meth)acrylic acid ester monomer having a $C_1$-$C_{14}$ alkyl group; ii) at least one monomer selected from the group consisting of allyl esters, vinyl esters, unsaturated acetates, and unsaturated nitriles; iii) at least one monomer selected from the group consisting of unsaturated carbonic acids and hydroxyl group-containing unsaturated monomers; and iv) a crosslinking agent.

In one embodiment, the monomer of i) may be at least one selected from the group consisting of methyl(meth)acrylate, ethyl(meth)acrylate, propyl(meth)acrylate, isopropyl(meth)acrylate, butyl(meth)acrylate, isobutyl acrylate, t-butyl methacrylate, pentyl methacrylate, hexyl methacrylate, heptyl acrylate, isooctyl acrylate, octyl methacrylate, 2-ethylhexyl(meth)acrylate, isodecyl acrylate, decyl methacrylate, dodecyl methacrylate, isobornyl methacrylate, and lauryl (meth)acrylate. In particular, the monomer of i) may be a mixture of 20 wt % to 40 wt % of 2-ethylhexyl acrylate and 60 wt % to 80 wt % of butyl acrylate based on a total weight of the (meth)acrylic acid ester monomer.

The amount of the monomer of i) may be 60 wt % to 90 wt % based on a total weight of the acrylic monomer mixture. When the amount of the monomer of i) is less than 60 wt %, it is impossible to obtain initial adhesion. On the other hand, when the amount of the monomer of i) exceeds 90 wt %, transfer of adhesive to a material to be adhered when the adhesive is peeled from the material to be adhered largely occurs.

In addition, the alkyl group of the monomer of i) may have a carbon number of 1 to 14, for example, a carbon number of 2 to 14. When the carbon number of the alkyl group of the monomer of i) is less than 1, cohesive strength of the adhesive composition is reduced. On the other hand, when the carbon number of the alkyl group of the monomer of i) exceeds 14, the adhesive composition becomes too soft and thus adhesive physical properties thereof are deteriorated.

In one embodiment, the monomer of ii) may be at least one selected from the group consisting of vinyl acetate, vinyl butyrate, vinyl propionate, vinyl laurate, vinyl pyrrolidone, acrylonitrile, and methacrylonitrile. In particular, vinyl acetate, vinyl butyrate, or acrylonitrile may be used.

The amount of the monomer of ii) may be 5 wt % to 35 wt %, for example, 7 wt % to 25 wt %, based on the total weight of the acrylic monomer mixture. When the amount of the monomer of ii) is less than 5 wt %, the adhesive composition becomes too soft and thus it is impossible to achieve sufficient adhesive physical properties. When the amount of the monomer of ii) exceeds 35 wt %, the adhesive composition becomes excessively hard and thus adhesion is significantly reduced.

In one embodiment, the monomer of iii) may be at least one selected from the group consisting of acrylic acid, itaconic acid, maleic anhydride, fumaric acid, crotonic acid, methacrylic acid, ethyl methacrylate, hydroxymethyl(meth)acrylate, hydroxyethyl(meth)acryl ate, hydroxypropyl (meth)acryl ate, hydroxybutyl(meth)acryl ate, hydroxyhexyl (meth)acrylate, hydroxyoctyl(meth)acrylate, hydroxylauryl (meth)acrylate, and hydroxypropyleneglycol(meth)acrylate.

The amount of the monomer of iii) may be 0.5 wt % to 5 wt % based on the total weight of the acrylic monomer mixture. When the amount of the monomer of iii) is less than 0.5 wt %, the adhesive composition becomes too soft and thus it is impossible to achieve sufficient adhesive physical properties. When the amount of the monomer of iii) exceeds 5 wt %, the adhesive composition becomes excessively hard and thus adhesion is significantly reduced.

The crosslinking agent of iv) is added to enhance adhesion. In one embodiment, the crosslinking agent may contain 5 to 15 alkylene oxide groups, for example, 6 to 12 alkylene oxide groups. When the crosslinking agent contains alkylene oxide groups within the above-described ranges, the adhesive composition has excellent adhesion at room temperature and after aging and high stability.

For reference, the number of the alkylene oxide groups denotes the average number of alkylene oxide groups contained in the crosslinking agent. When the number of the alkylene oxide groups in the crosslinking agent is less than 5, a prepared adhesive composition becomes unnecessarily hard and thus initial adhesion is reduced. On the other hand, when the number of the alkylene oxide groups in the crosslinking agent exceeds 15, the adhesive composition becomes unnecessarily soft and thus adhesive physical properties are deteriorated.

In one embodiment, the crosslinking agent may be at least one selected from the group consisting of organic crosslinking agents such as polyethylene glycol diacrylate, polypropylene glycol diacrylate, 1,6-hexanediol diacrylate, trimethylolpropane triacrylate, ethoxylated trimethylolpropane triacrylate, tripropylene glycol diacrylate, 1,3-butanediol diacrylate, pentaerythritol triacrylate, 3-trimethoxysilyl propyl methacrylate, vinyl trimethoxy silane, divinyl benzene, and the like; and inorganic crosslinking agents such as aluminum acetylacetonate, zinc acetate, zirconium carbonate, and the like. In particular, the crosslinking agent may be at least one selected from the group consisting of polyethylene glycol diacrylate and polypropylene glycol diacrylate.

In one embodiment, the acrylic monomer mixture may further include an epoxy group-containing unsaturated monomer. In particular, the epoxy group-containing unsaturated monomer may be at least one selected from the group consisting of glycidyl(meth)acrylate, alpha-methylglycidyl (meth)acrylate, allyl glycidyl ether, oxo-cyclohexyl(meth) acrylate, and 3,4-epoxycyclohexylmethyl(meth)acrylate. More particularly, the epoxy group-containing unsaturated monomer may be glycidyl(meth)acrylate or allyl glycidyl ether.

In one embodiment, the amount of the epoxy group-containing unsaturated monomer may be 0.1 wt % to 3 wt % based on the total weight of the acrylic monomer mixture. When the amount of the epoxy group-containing unsaturated monomer is within the above-described ranges, the adhesive composition has sufficient cohesive strength.

The present invention also provides a method of preparing the acryl-silicone-based hybrid emulsion adhesive composition.

The method of preparing the acryl-silicone-based hybrid emulsion adhesive composition includes:

(A) preparing an emulsion including a seed formed of a reactive silicone resin;

(B) preparing a pre-emulsion including an acrylic monomer mixture including, based on a total weight of the acrylic monomer mixture, i) 60 wt % to 90 wt % of a (meth)acrylic acid ester monomer having a $C_1$-$C_{14}$ alkyl group, ii) 5 wt % to 35 wt % of at least one monomer selected from the group consisting of allyl esters, vinyl esters, unsaturated acetates, and unsaturated nitriles, iii) 0.5 wt % to 5 wt % of at least one monomer selected from the group consisting of unsaturated carbonic acids and hydroxyl group-containing unsaturated monomers, and iv) 0.1 wt % to 3 wt % of a crosslinking agent; and (C) preparing an acrylic emulsion resin through polymerization by adding an initiator and the pre-emulsion prepared by the process (B) to the emulsion prepared by the process (A).

The term "pre-emulsion" as used herein may be defined as a solution including distilled water, an electrolyte, a surfactant, and the like, in addition to the acrylic monomer mixture.

Preparation of the acrylic emulsion resin may be performed by emulsion polymerization, for example, seed polymerization.

The preparation of the acrylic emulsion resin through emulsion polymerization will now be described in detail. First, distilled water and a reactive silicone resin are added to a reactor, a temperature of the reactor is raised to remove oxygen therefrom, and an initiator is dissolved in the resulting solution to prepare an emulsion. Separately, distilled water, an electrolyte, and a surfactant are added to a mixture of i) 60 wt % to 90 wt % of a (meth)acrylic acid ester monomer having a $C_1$-$C_{14}$ alkyl group, ii) 5 wt % to 35 wt % of at least one monomer selected from the group consisting of allyl esters, vinyl esters, unsaturated acetates, and unsaturated nitriles, iii) 0.5 wt % to 5 wt % of at least one monomer selected from the group consisting of unsaturated carbonic acids and hydroxyl group-containing unsaturated monomers, and iv) 0.1 wt % to 3 wt % of a crosslinking agent to prepare a pre-emulsion. Subsequently, an initiator and the pre-emulsion are continuously added to the emulsion, a temperature of the reactor is raised and then cooled to room temperature, and pH of the resulting product is adjusted.

In one embodiment, the initiator may be a water-soluble polymerization initiator, such as a persulfate of ammonium or an alkali metal, hydrogen peroxide, a peroxide, a hydroperoxide, or the like and may be used in combination with at least one reducing agent to implement emulsion polymerization at low temperature. The reducing agent may be sodium bisulfite, sodium metabisulfite, sodium hydrosulfite, sodium thiosulfate, sodium formaldehyde sulfoxylate, ascorbic acid, or the like.

The emulsion polymerization may be performed at a temperature of 0° C. to 100° C., for example, 40° C. to 90° C. and the temperature may be adjusted using a method, such as use of the initiator alone, use of the initiator in combination with at least one of the reducing agents, or the like.

The electrolyte used in the polymerization reaction serves to adjust pH and impart stability to the prepared acrylic emulsion resin. In particular, the electrolyte may be at least one selected from the group consisting of sodium bicarbonate, sodium carbonate, sodium phosphate, sodium sulfate, and sodium chloride. More particularly, the electrolyte may be sodium carbonate. The amount of the electrolyte may be 0.1 parts by weight to 2 parts by weight, for example, 0.3 parts by weight to 1 part by weight, based on 100 parts by weight of the mixture.

The surfactant serves to produce initial micelles during emulsion polymerization, adjust the size of the produced micelles, and impart stability to the produced micelles. The surfactant consists of a hydrophilic group and a lipophilic group and is classified into an anionic surfactant, a cationic surfactant, and a non-ionic surfactant. Anionic and non-ionic surfactants are mainly used and may be used in combination to complement mechanical stability and chemical stability.

Examples of the anionic surfactant include, without being limited to, sodium alkyldiphenyloxide disulfonate, sodium polyoxyethylene alkyl ether sulfate, sodium polyoxyethylene lauryl ether sulfate, and sodium dialkyl sulfosuccinate. Examples of the non-ionic surfactant include, without being limited to, polyethylene oxide alkyl aryl ether, polyethylene oxide alkylamine, and polyethylene oxide alkyl ester. These anionic surfactants may be used alone or at least two thereof may be used in combination, and these non-ionic surfactants may be used alone or at least two thereof may be used in combination. Such cases may be more effective than a case in which an anionic surfactant and a non-ionic surfactant are used in combination.

Meanwhile, pH of the acrylic emulsion resin may be adjusted using an alkaline material. In this regard, the acrylic emulsion resin may have a pH of 6 to 9, for example, a pH of 7 to 8. The alkaline material may be an inorganic material such as a hydroxide, chloride, carbonate or the like of a monovalent or divalent metal; ammonia; an organic amine; or the like.

In addition, the adhesive composition including an acrylic emulsion resin according to the present invention may further include a thickener and a wetting agent so as to prevent contraction of an acryl-silicone-based hybrid emulsion adhesive composition, which occurs when coated on a surface of silicone release paper.

The thickener may be carboxymethyl cellulose (CMC), acrylic sol, polyvinyl alcohol, starch, alginate, dextrin, or the like, in particular polyvinyl alcohol.

The wetting agent serves to satisfactorily adhere an adhesive to a surface of hydrophobic silicone release paper by changing hydrophilicity of the adhesive to hydrophobicity and may be generally a surfactant mixture, which may further include a glycol or an alcohol.

Since the acryl-silicone-based hybrid emulsion adhesive composition includes a surfactant, foaming occurs in a process of mixing subsequently added materials (e.g., a thickener, a wetting agent, and the like), which causes a non-uniform coated surface of an adhesive, and thus, generated foams may be removed using an antifoaming agent.

The antifoaming agent may be a silicone-based antifoaming agent, a surfactant-based antifoaming agent, a paraffin-based antifoaming agent, a mineral oil type antifoaming agent, or the like. Preferably, the antifoaming agent may be a silicone-based antifoaming agent.

The present invention also provides an adhesive sheet including an adhesive layer formed by applying the acryl-silicone-based hybrid emulsion adhesive composition on an adhesive film or sheet.

The adhesive sheet may be an adhesive film or sheet for interior/exterior materials of buildings, interior design materials, advertising films, or labels. The adhesive layer may have a thickness of 10 μm to 100 μm, for example, 20 μm to 30 μm and have high coatability and sufficient adhesive physical properties.

BEST MODE

Now, the present invention will be described in more detail with reference to the following examples. These examples are provided only for illustration of the present invention and should not be construed as limiting the scope and spirit of the present invention.

Example 1

To a 3 L glass reactor equipped with a thermostat, a stirrer, a dropping funnel, a nitrogen gas injection tube, and a reflux condenser were added 60 g of distilled water and 166 g of vinyl terminated polydimethylsiloxane (Mw=5000 g/mol, 30% solution). Air inside of the reactor was replaced with nitrogen while stirring the resulting solution and the temperature therein was raised to 80° C. in nitrogen atmosphere and maintained for 60 minutes, thereby completing preparation of an emulsion.

Separate from the preparation of the emulsion in the reactor, to prepare a pre-emulsion of acrylic monomers, a solution consisting of a monomer mixture of 500 g of butylacrylate, 330 g of 2-ethylhexylacrylate, 100 g of vinyl acetate, 50 g of acrylonitrile, 20 g of acrylic acid, and 2 g of polyethylene glycol diacrylate, 15 g of a 60% sodium dioctyl sulfosuccinate solution, 50 g of a 30% sodium polyoxyethylene lauryl ether sulfate solution, 2 g of sodium carbonate, 2 g of sodium methylallyl sulfonate, and 270 g of distilled water was added to a beaker and stirred using a stirrer to prepare a milky pre-emulsion.

Subsequently, 5 g of a 10% ammonium persulfate solution was added to the glass reactor containing the emulsion and dissolved therein by stirring for 10 minutes.

The pre-emulsion and 120 g of a 10% ammonium persulfate solution were continuously added in an equal ratio to the glass reactor containing the emulsion for 4 hours, followed by further addition of 5 g of a 10% ammonium persulfate solution, the temperature in the glass reactor was raised to 80° C. for 30 minutes and maintained at 80° C. for 1 hour and cooled to room temperature to prepare an acrylic emulsion resin.

Thereafter, a 28% aqueous ammonia solution was added to the acrylic emulsion resin to adjust pH to 7.5.

Example 2

An acrylic emulsion resin was prepared in the same manner as in Example 1, except that 332 g of vinyl terminated polydimethylsiloxane (Mw=5000 g/mol, 30% solution) was added to the glass reactor.

Example 3

An acrylic emulsion resin was prepared in the same manner as in Example 1, except that 498 g of vinyl terminated polydimethylsiloxane (Mw=5000 g/mol, 30% solution) was added to the glass reactor.

Example 4

An acrylic emulsion resin was prepared in the same manner as in Example 1, except that 664 g of vinyl terminated polydimethylsiloxane (Mw=5000 g/mol, 30% solution) was added to the glass reactor.

Comparative Example 1

An acrylic emulsion resin was prepared in the same manner as in Example 1, except that 200 g of distilled water was added to the glass reactor and vinyl terminated polydimethylsiloxane (Mw=5000 g/mol, 30% solution) was not added thereto.

Comparative Example 2

An acrylic emulsion resin was prepared in the same manner as in Example 1, except that 83 g of vinyl terminated polydimethylsiloxane (Mw=5000 g/mol, 30% solution) was added to the glass reactor.

Comparative Example 3

100 g (63% solid content) of the acrylic emulsion resin prepared according to Comparative Example 1 was added to a 500 ml beaker, 20 g of vinyl terminated polydimethylsiloxane (Mw=5000 g/mol, 30% solution) was added thereto, and the resulting solution was stirred for 1 hour to prepare an acryl-silicone-based blend resin.

Comparative Example 4

An acryl-silicone-based blend resin was prepared in the same manner as in Comparative Example 3, except that twice the amount of vinyl terminated polydimethylsiloxane (Mw=5000 g/mol, 30% solution) was used.

Comparative Example 5

100 g (63% solid content) of the acrylic emulsion resin of Comparative Example 1 was added to a 500 ml beaker, 20 g of silica sol (or colloidal silica, pH: 9.5 to 10.5, 30% solution) was added thereto, and the resulting solution was stirred for 1 hour to prepare an acryl-silica sol blend resin.

Comparative Example 6

An acryl-silica sol blend resin was prepared in the same manner as in Comparative Example 5, except that twice the amount of silica sol (or colloidal silica, pH: 9.5 to 10.5, 30% solution) was used.

Experimental Example 1

Preparation of Paper Label Coated with Adhesive

Each of the resins prepared according to Examples 1 to 4 and Comparative Examples 1 to 6 was coated onto silicone-coated release paper and the coated release paper was dried in an oven at 120° C. for 1 minute to form an adhesive layer having a thickness of 20 μm. The resultant release paper was laminated with paper or a film to form a paper or film label and the paper or film label was cut to a size of 25 mm×100 mm, thereby completing fabrication of a paper or film label specimen, and adhesive physical properties of each specimen were evaluated. In this regard, glossy paper or thermal paper was used as the paper and PVC, BOPP, PE, or PET was used as the film. In this experiment, the label was prepared using glossy paper and PET as bases.

Adhesion characteristics of the adhesives of Examples 1 to 4 and Comparative Examples 1 to 6 were evaluated using the following methods and evaluation results are shown in Table 1 below.

Peel Strength Test: Adhesive strengths of the adhesive label specimens were measured in accordance with FINAT TEST METHOD NO. 2. Accordingly, each adhesive label specimen was attached to a glass plate by reciprocating a 2 kg roller over a surface of the adhesive label specimen at a rate of 300 mm/min and aged at room temperature for 20 minutes, and the aged adhesive label specimen was subjected to 180° peeling at a rate of 300 mm/min using a TA Texture Analyzer.

Holding Power Test: Each adhesive label specimen (width: 25 mm) was cut to a size of 25 mm×25 mm and attached to an SUS plate (SUS#304, thickness: 1.5 t). In this regard, attachment was performed by reciprocating a 2 kg roller over a surface of the adhesive label specimen at a rate of 300 mm/min, the SUS plate attached by the adhesive label specimen was maintained at room temperature for 30 minutes and then 1 kg of a weight was hung on the adhesive label specimen, and time at which the adhesive label specimen is separated from the SUS plate was measured. In addition, time at which the adhesive label specimen is separated from the SUS plate was measured using the same method at 80°.

Aging/Hygrothermal Resistance Test: Each adhesive label specimen was exposed to high temperature and high humidity conditions by being placed in an oven at a temperature of 65° C. and a relative humidity of 80%, which are conditions for measuring deterioration of adhesive physical properties, for 4 days, the adhesive label specimen was maintained at room temperature for 1 day, and then peel strength thereof was measured.

TABLE 1

| | Paper | | | | PET film | | | |
| | 180° peel strength (N/in) | | Holding power (hr) | | 180° peel strength (N/in) | | Holding power (hr) | |
| | normal | aging | normal | 80° C. | normal | aging | normal | 80° C. |
| Example 1 | 15.3 | 13.5 | 30 | 25 | 10.4 | 8.2 | 40 | 27 |
| Example 2 | 16.6 | 14.2 | 33 | 23 | 11.6 | 10.1 | 43 | 33 |
| Example 3 | 15.5 | 13.6 | 37 | 30 | 11.3 | 10.5 | 42 | 33 |
| Example 4 | 14.7 | 12.7 | 38 | 31 | 12.4 | 11.2 | 38 | 34 |
| Comparative Example 1 | 12.1 | 6.4 | 25 | 2 | 10.3 | 8.4 | 27 | 3 |
| Comparative Example 2 | 11.6 | 9.3 | 23 | 5 | 12.8 | 10.4 | 23 | 5 |
| Comparative Example 3 | 7.5 | 6.2 | 10 | 7 | 9.5 | 8.3 | 17 | 10 |
| Comparative Example 4 | 8.3 | 7.4 | 15 | 8 | 9.4 | 8.5 | 18 | 13 |
| Comparative Example 5 | 7.7 | 6.3 | 30 | 20 | 8.5 | 7.1 | 14 | 10 |
| Comparative Example 6 | 6.2 | 5.6 | 33 | 23 | 7.8 | 5.8 | 15 | 11 |

* normal: 23° C., RH = 50%, aging: oven 65° C., RH = 80%, 4days

As shown in Table 1 above, it can be confirmed that both the paper and film bases including the resins of Examples 1 to 4 exhibit excellent peel strength and holding power and, in particular, the paper bases exhibit higher peel strength and the film bases exhibit higher holding power, than those of paper and film bases including the resins of Comparative Examples 1 to 6.

Meanwhile, when compared with the paper and film bases including the resins of Comparative Examples 5 and 6 including silica sol, the paper bases including the resins of Examples 1 and 2 have similar holding power while exhibiting significantly enhanced peel strength and the film bases including the resins of Examples 1 and 2 exhibit significantly enhanced peel strength and holding power.

In addition, it can be confirmed that, when compared to the paper and film bases including the resins of Comparative Examples 1 and 2, the film bases including the resins of Examples 1 to 4 exhibit similar peel strength while exhibiting significantly increased holding power and the paper bases including the resins of Examples 1 to 4 exhibit significantly enhanced peel strength and holding power.

That is, it can be confirmed that both the paper and film bases including the resins of Examples 1 to 4 have high peel strength and holding power both at room temperature and under high temperature and high humidity conditions and, accordingly, have excellent weather resistance and heat resistance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As described above, according to the present invention, an acryl-silicone-based hybrid emulsion adhesive composition is prepared by copolymerizing a reactive silicone resin as a seed and an acrylic monomer mixture through emulsion polymerization and thus exhibits advantages of existing acrylic adhesives and characteristics of silicones, i.e., weather resistance and heat resistance. Thus, a paper or film label including the adhesive composition maintains high peel strength and cohesive strength even at high temperature and high humidity.

The invention claimed is:

1. A composition comprising:
a seed formed of a reactive silicone resin, and
an acrylic monomer mixture consisting of: i) 60 wt % to 90 wt % of a (meth)acrylic acid ester monomer having a C1-C14 alkyl group; ii) 5 wt % to 35 wt % of at least one monomer selected from the group consisting of allyl esters, vinyl esters, unsaturated acetates, and unsaturated nitriles; iii) 0.5 wt % to 5 wt % of at least one monomer selected from the group consisting of unsaturated carbonic acids and hydroxyl group-containing unsaturated monomers; and iv) 0.1 wt % to 3 wt % of a crosslinking agent, based on a total weight of the acrylic monomer mixture,
wherein the reactive silicone resin comprises polyalkylsiloxane having a functional group,
wherein the functional group is a hexenyl group, and
wherein an amount of the seed is 10 parts by weight to 20 parts by weight based on 100 parts by weight of the acrylic monomer mixture.

2. The composition according to claim 1, wherein the reactive silicone resin has a molecular weight of 500,000 g/mol or less.

3. The composition according to claim 1, wherein the monomer of i) is at least one selected from the group consisting of methyl(meth)acrylate, ethyl(meth)acrylate, propyl(meth)acrylate, isopropyl(meth)acrylate, butyl(meth)acrylate, isobutyl acrylate, t-butyl methacrylate, pentyl methacrylate, hexyl methacrylate, heptyl acrylate, isooctyl acrylate, octyl methacrylate, 2-ethylhexyl(meth)acrylate, isodecyl acrylate, decyl methacrylate, dodecyl methacrylate, isobornyl methacrylate, and lauryl(meth)acrylate.

4. The composition according to claim 1, wherein the monomer of i) comprises a mixture of 20 wt % to 40 wt % of 2-ethylhexyl acrylate and 60 wt % to 80 wt % of butyl acrylate based on a total weight of the (meth)acrylic acid ester monomer.

5. The composition according to claim 1, wherein the at least one monomer of ii) is at least one selected from the group consisting of vinyl acetate, vinyl butyrate, vinyl propionate, vinyl laurate, vinyl pyrrolidone, acrylonitrile, and methacrylonitrile.

6. The composition according to claim 1, wherein the at least one monomer of iii) is at least one selected from the group consisting of acrylic acid, itaconic acid, fumaric acid, crotonic acid, methacrylic acid, hydroxymethyl(meth)acrylate, hydroxyethyl(meth)acrylate, hydroxypropyl(meth)acrylate, hydroxybutyl(meth)acrylate, hydroxyhexyl(meth)acrylate, hydroxyoctyl(meth)acrylate, hydroxylauryl(meth)acrylate, and hydroxypropyleneglycol(meth)acrylate.

7. The composition according to claim 1, wherein the crosslinking agent has 5 to 15 alkylene oxide groups and is a compound having an acrylate group or a vinyl group.

8. The composition according to claim 7, wherein the crosslinking agent comprises at least one selected from the group consisting of polyethylene glycol diacrylate and polypropylene glycol diacrylate.

9. The composition according to claim 1, wherein the reactive silicone resin has a particle size of 50 nm to 200 nm.

10. A method of preparing an acryl-silicone-based hybrid emulsion adhesive using the composition of claim 1, the method comprising:
preparing an emulsion comprising the seed formed of the reactive silicone resin;
preparing a pre-emulsion comprising acrylic monomer mixture consisting of, based on a total weight of the acrylic monomer mixture, 60 wt % to 90 wt % of the (meth)acrylic acid ester monomer having a C1-C14 alkyl group, 5 wt % to 35 wt % of the at least one monomer selected from the group consisting of allyl esters, vinyl esters, unsaturated acetates, and unsaturated nitriles, 0.5 wt % to 5 wt % of the at least one monomer selected from the group consisting of unsaturated carbonic acids and hydroxyl group-containing unsaturated monomers, and 0.1 wt % to 3 wt % of the crosslinking agent; and
preparing the acryl-silicone-based hybrid emulsion adhesive through polymerization by adding an initiator and the pre-emulsion to the emulsion.

11. The method according to claim 10, wherein the initiator comprises at least one selected from the group consisting of a persulfate of ammonium or an alkali metal, hydrogen peroxide, a peroxide, and a hydroperoxide.

12. An adhesive sheet comprising an adhesive layer formed by polymerizing the composition according to claim 1, and applying the polymerized composition on an adhesive film or sheet.

* * * * *